G. S. HILL.
BUTTONHOLE SEWING MACHINE.
APPLICATION FILED SEPT. 6, 1913.

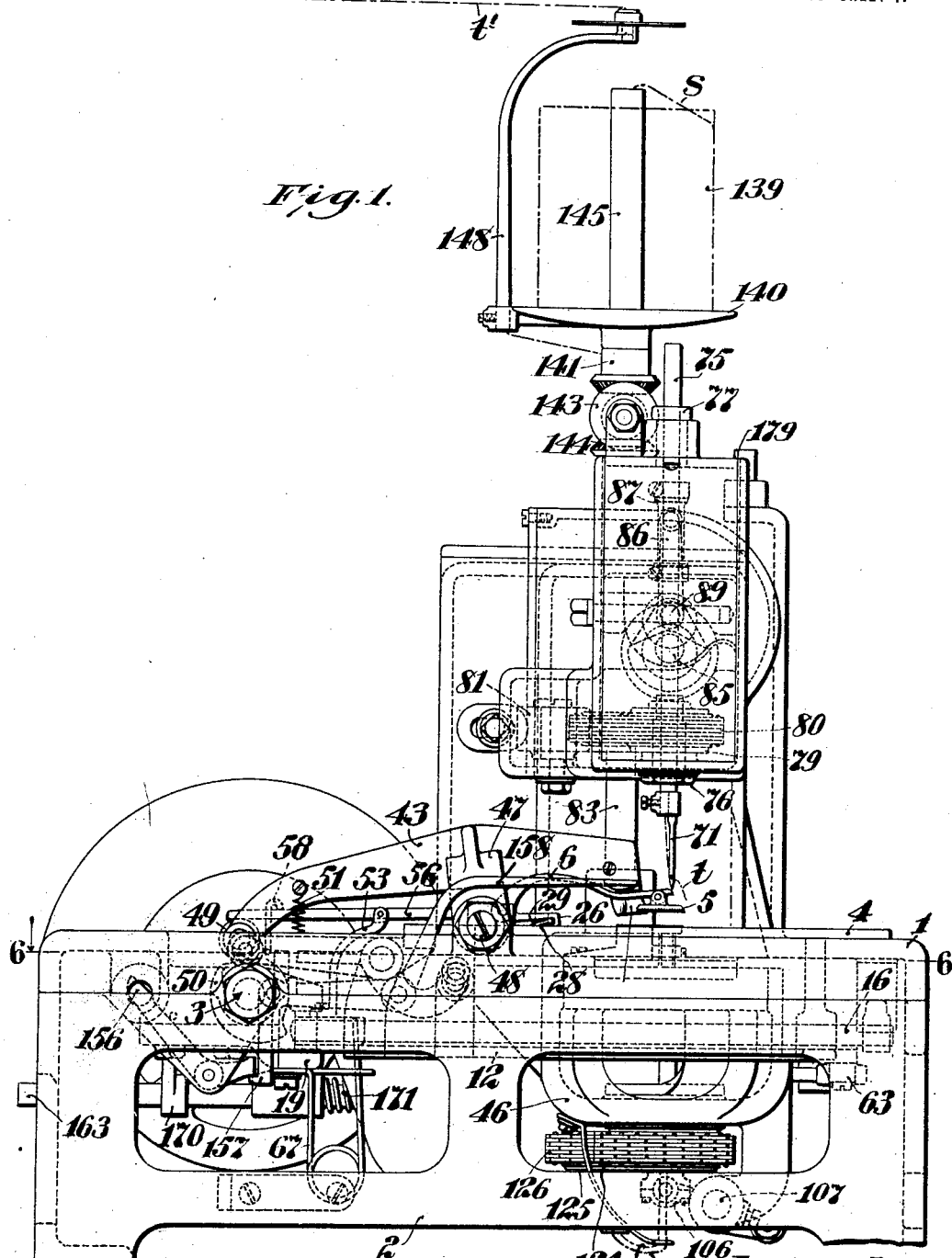

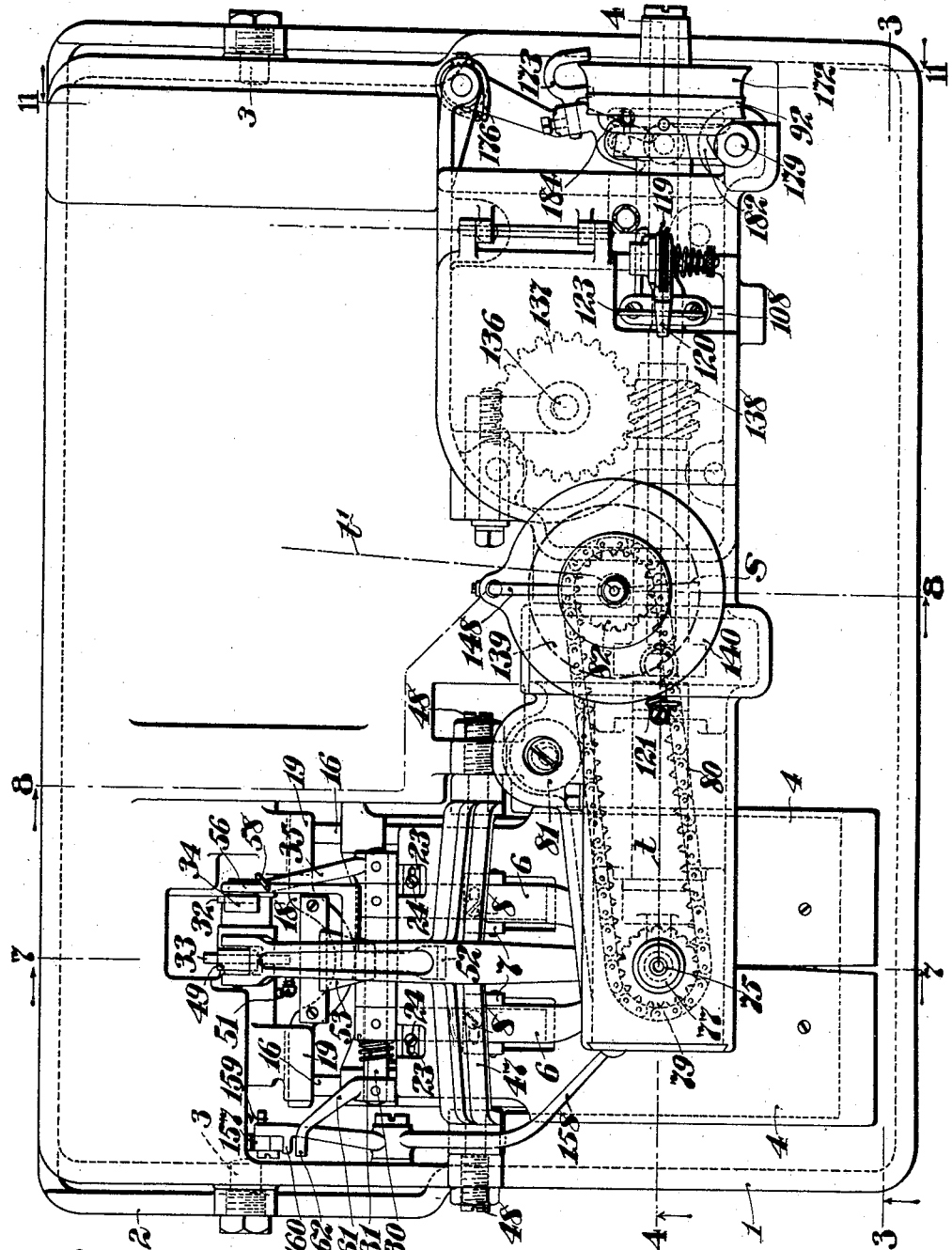

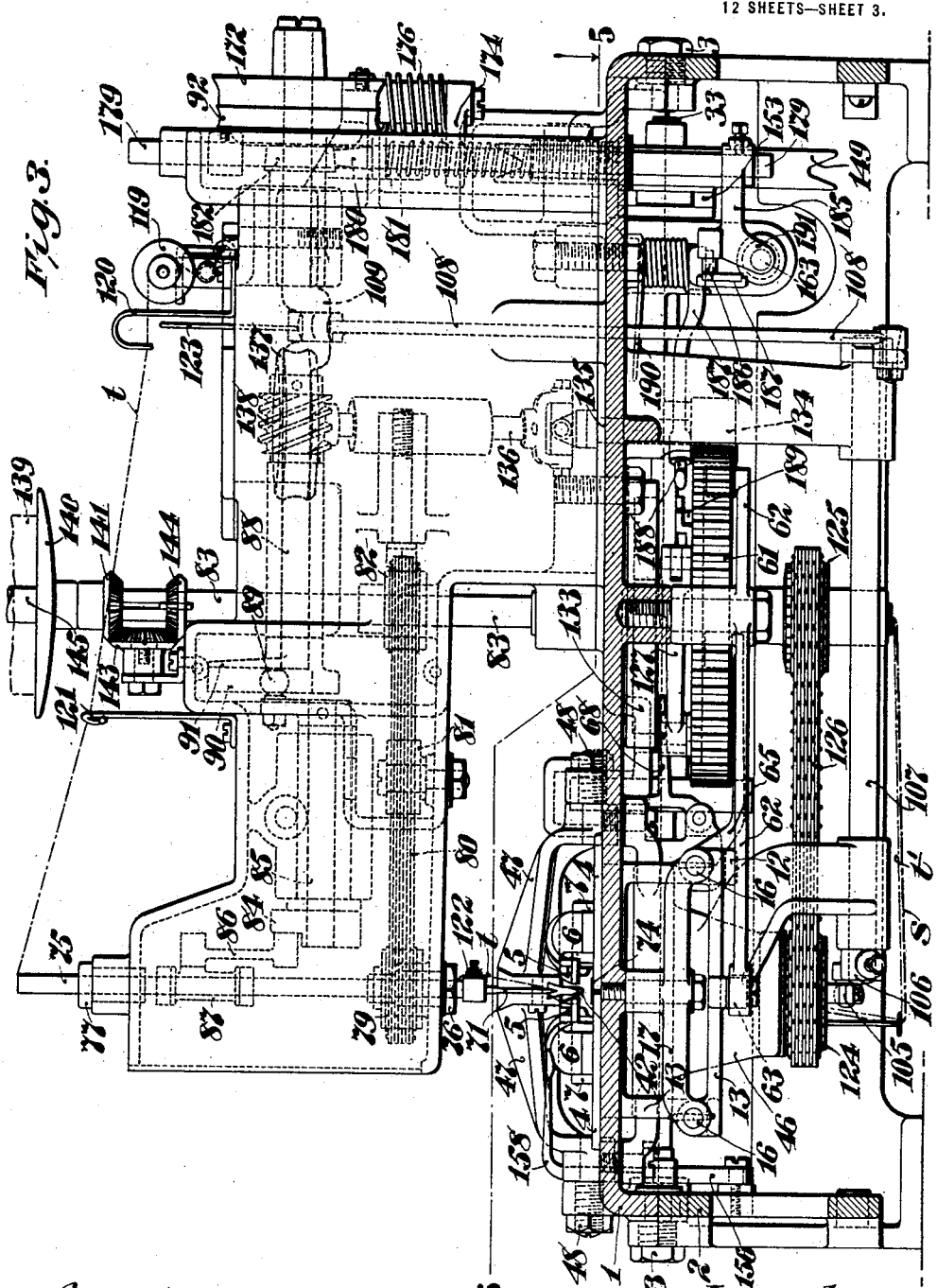

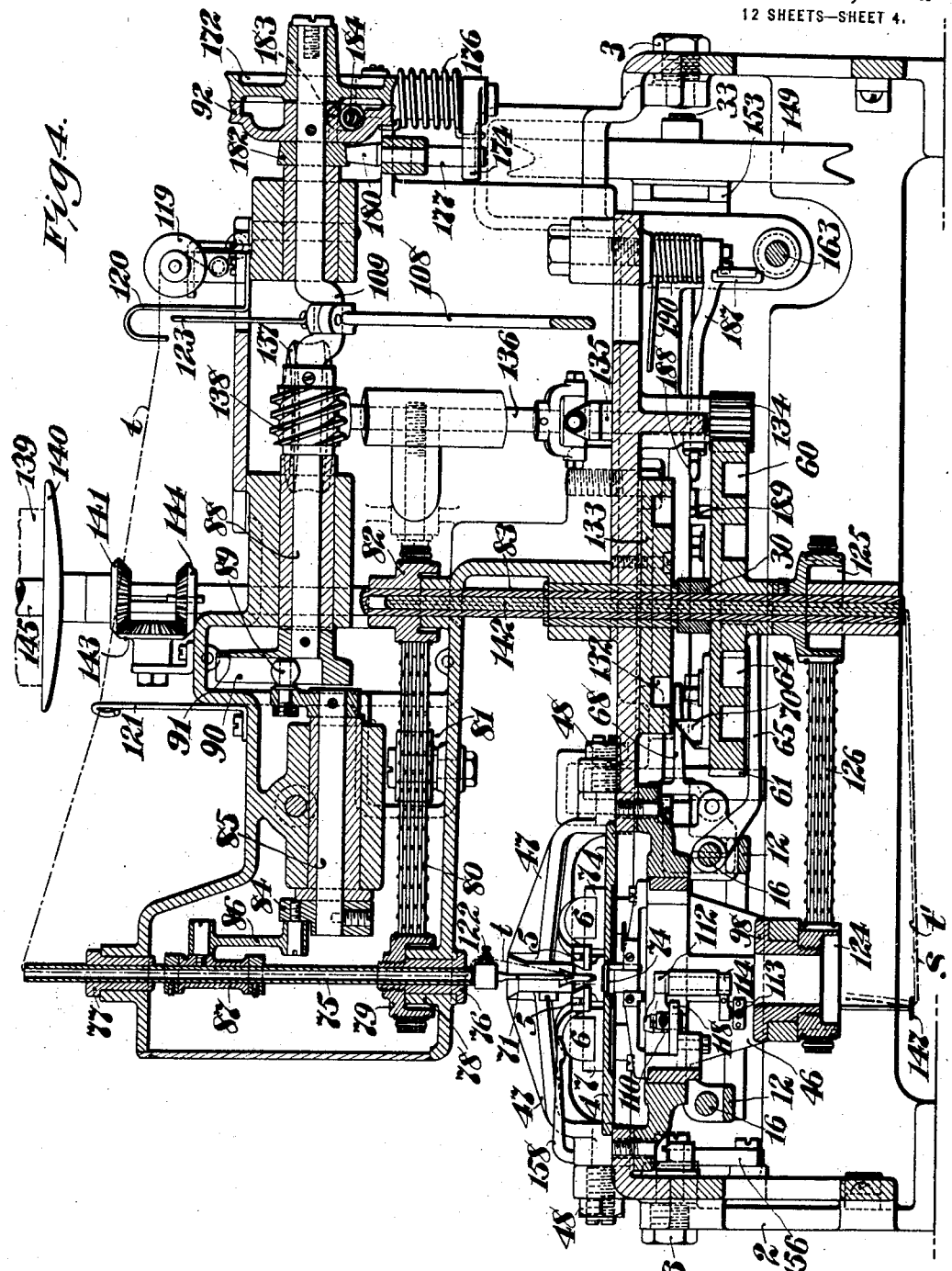

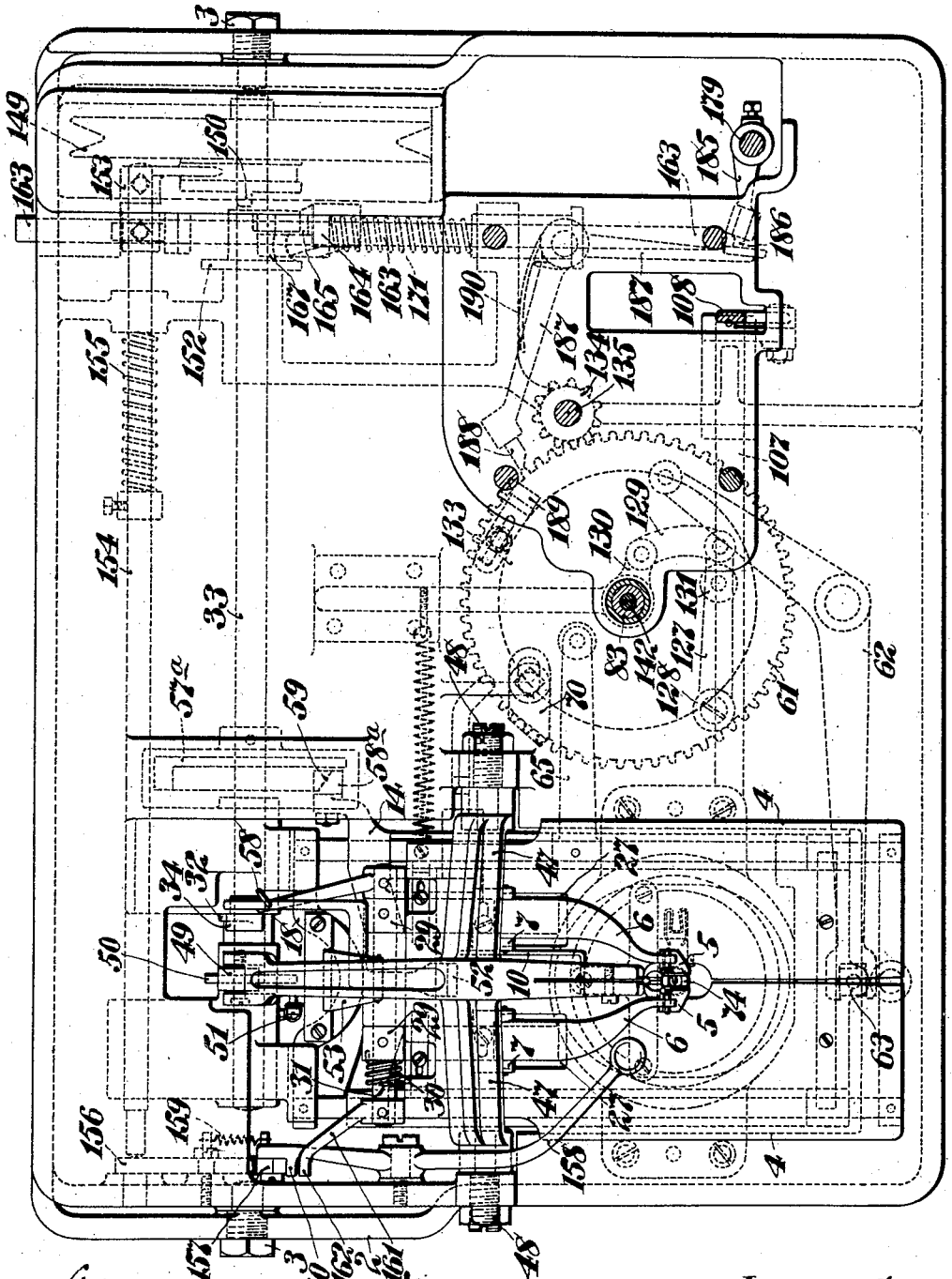

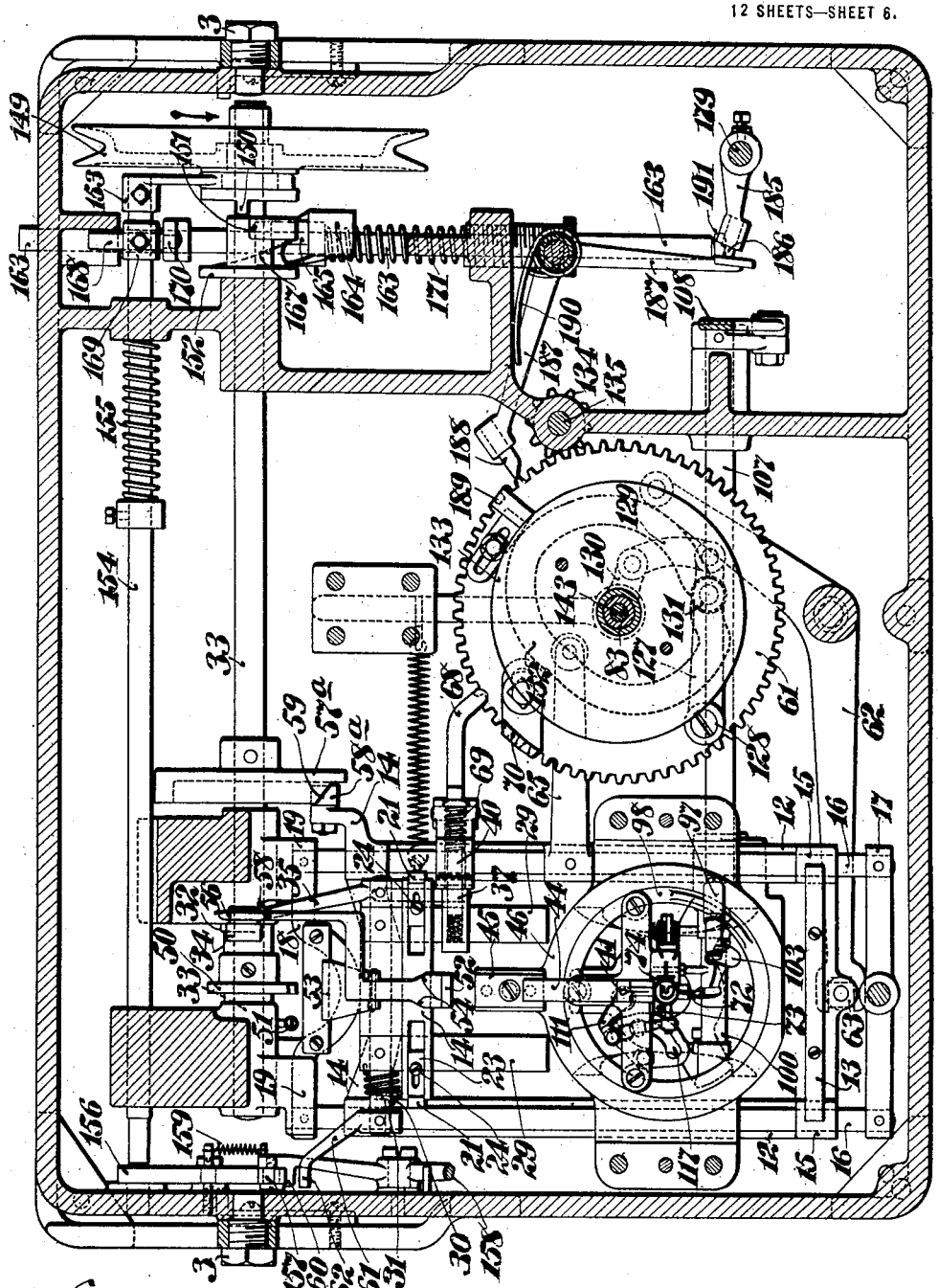

1,396,111.

Patented Nov. 8, 1921.
12 SHEETS—SHEET 7.

Witnesses:
E. C. Wurdeman
H. D. McPhail

Inventor.
George S. Hill
by Phillips Van Everen & Fish
Attys.

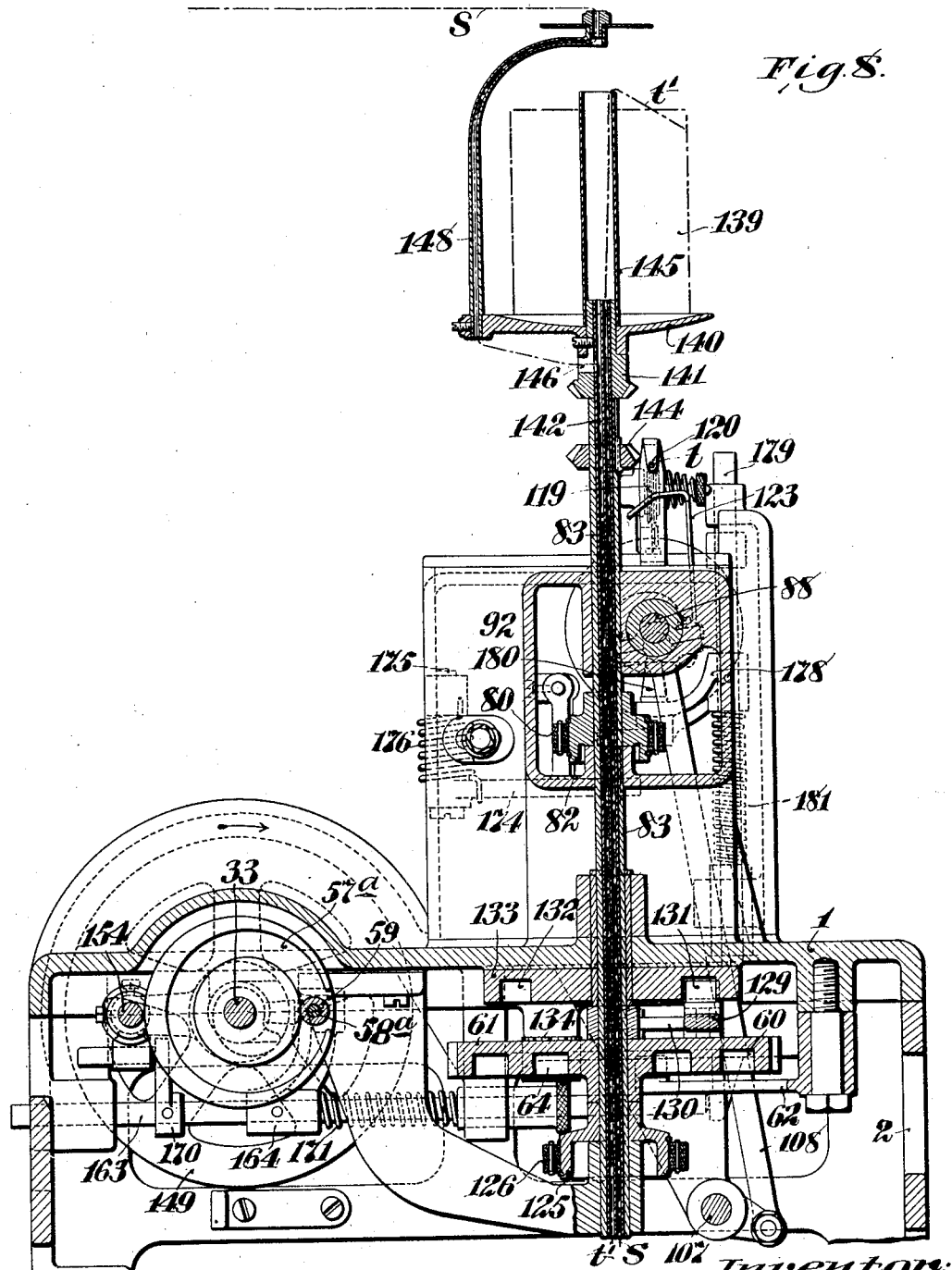

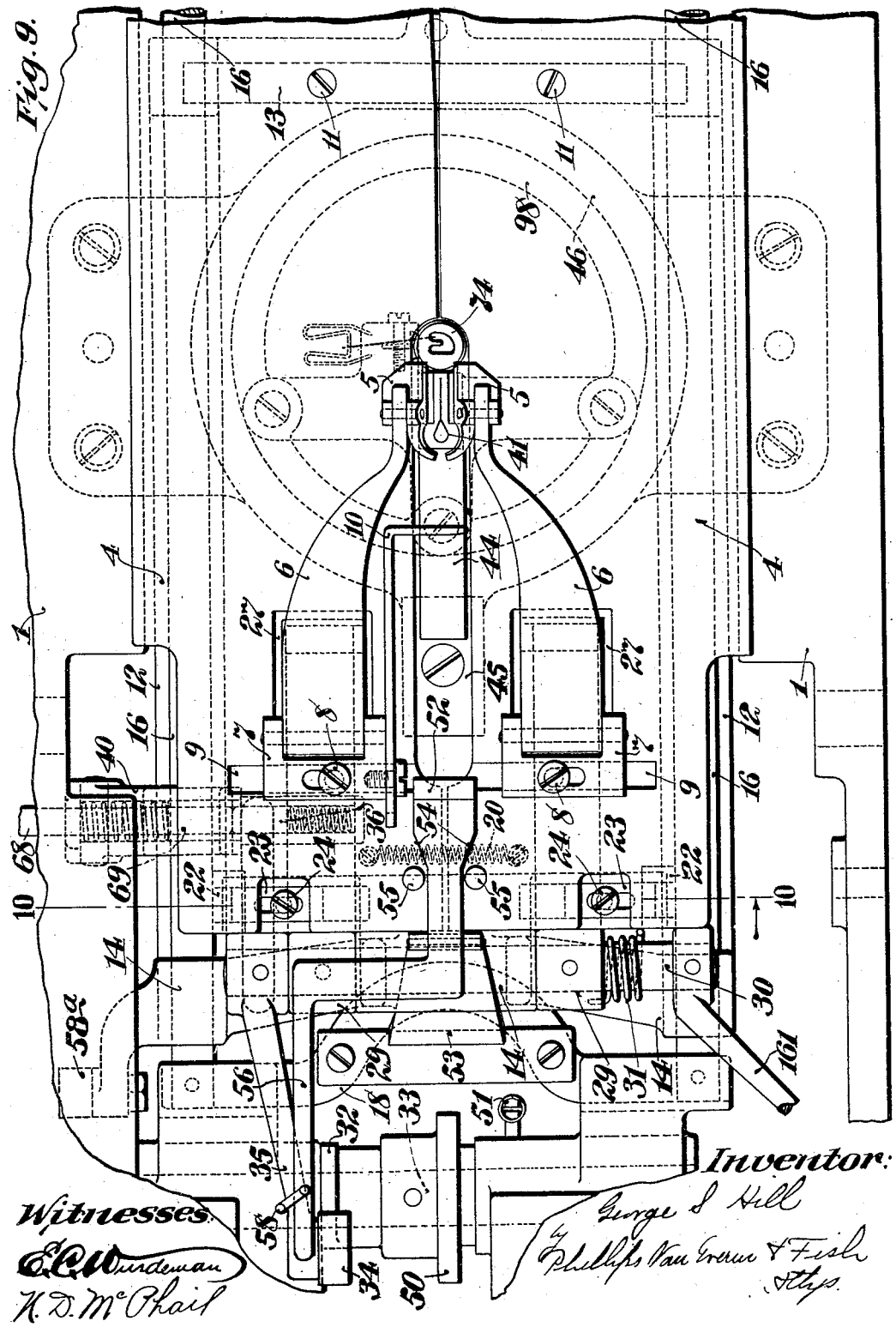

G. S. HILL.
BUTTONHOLE SEWING MACHINE.
APPLICATION FILED SEPT. 6, 1913.
1,396,111.
Patented Nov. 8, 1921.
12 SHEETS—SHEET 10.
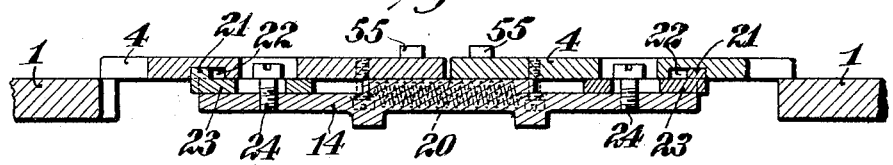
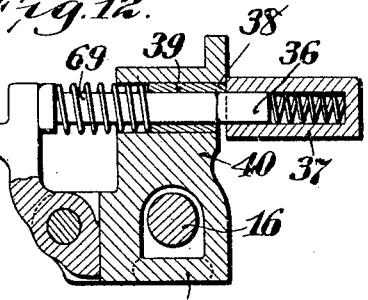
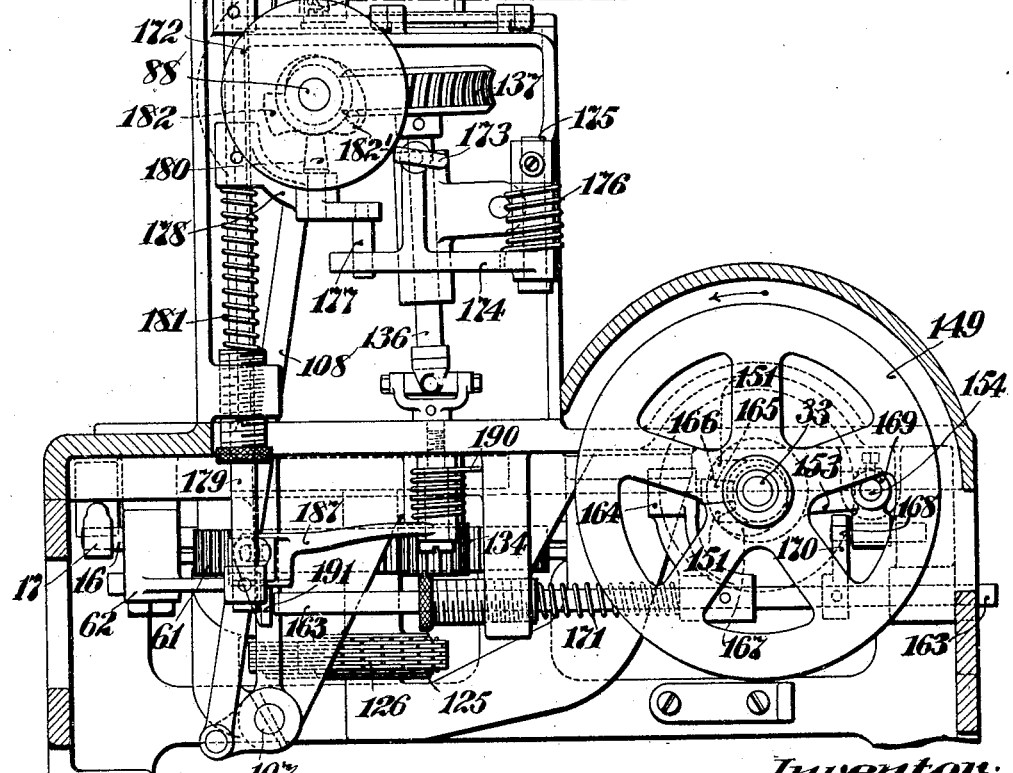

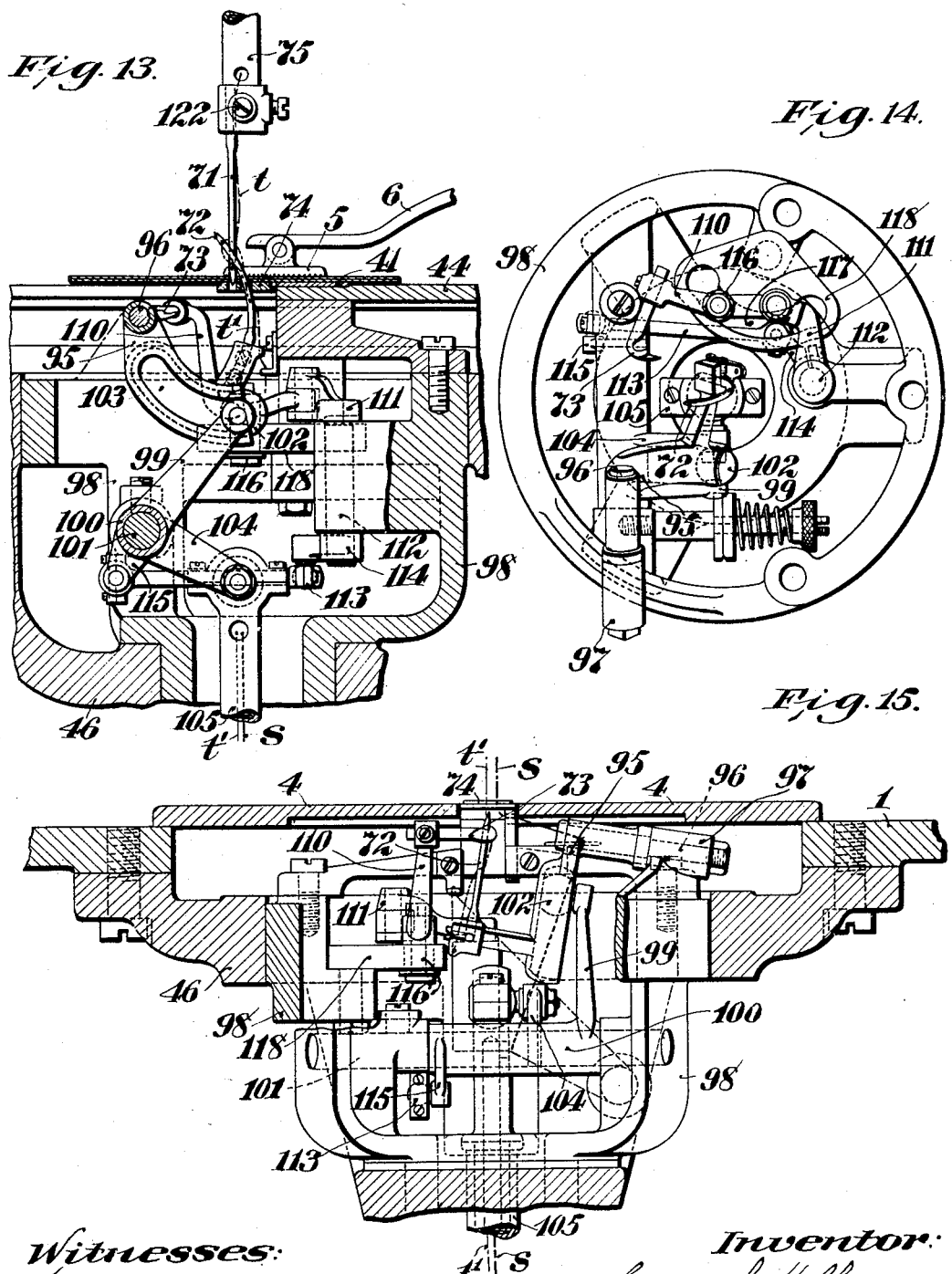

G. S. HILL.
BUTTONHOLE SEWING MACHINE.
APPLICATION FILED SEPT. 6, 1913.
1,396,111.
Patented Nov. 8, 1921.
12 SHEETS—SHEET 12.
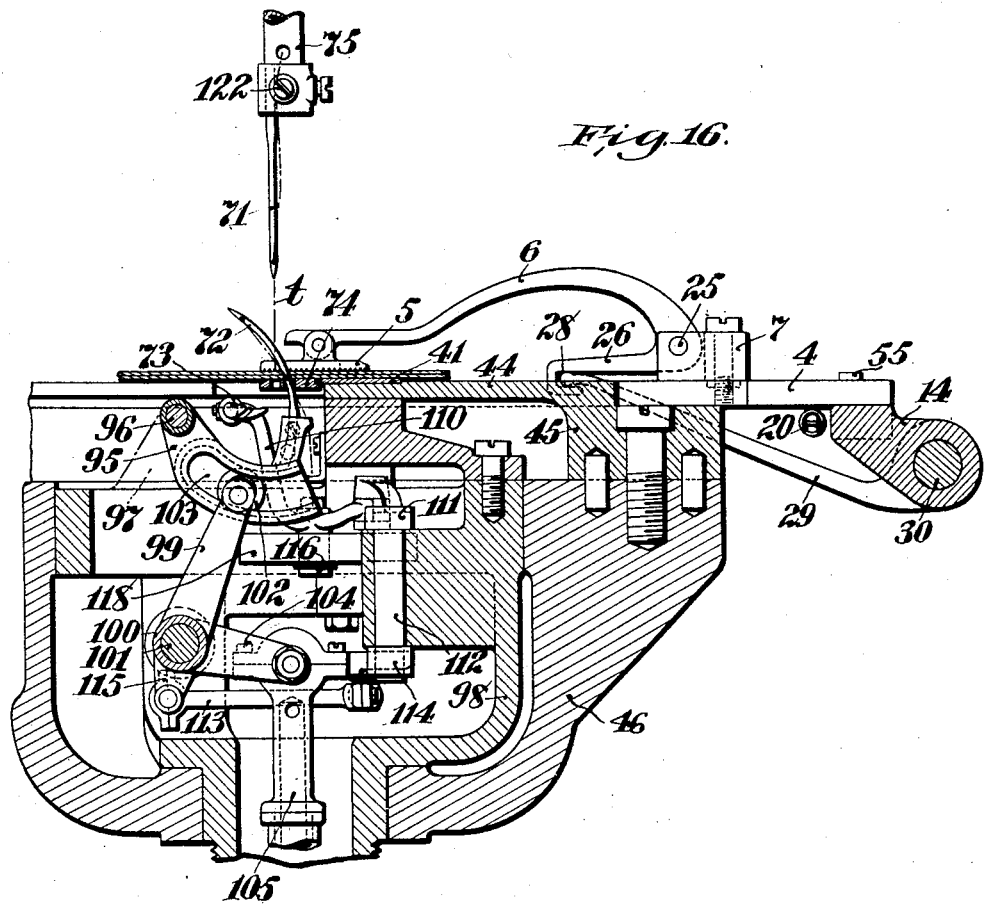
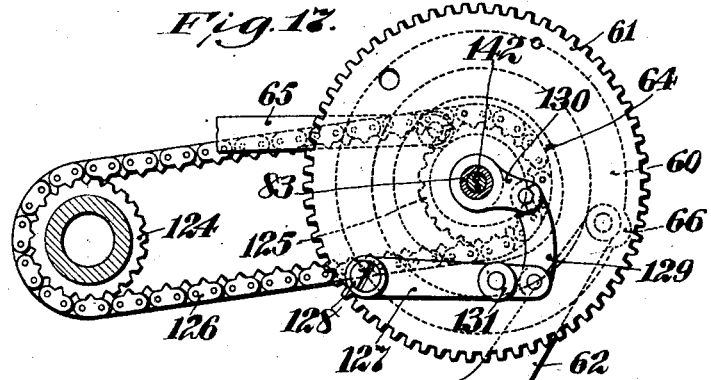
Witnesses:
E. C. Wurdeman
N. D. McPhail
Inventor:
George S. Hill
by Phillips Van Evera & Fish
Attys.

UNITED STATES PATENT OFFICE.

GEORGE S. HILL, OF STRAFFORD, NEW HAMPSHIRE, ASSIGNOR, BY MESNE ASSIGNMENTS, TO UNITED SHOE MACHINERY CORPORATION, OF PATERSON, NEW JERSEY, A CORPORATION OF NEW JERSEY.

BUTTONHOLE-SEWING MACHINE.

1,396,111.     Specification of Letters Patent.     Patented Nov. 8, 1921.

Application filed September 6, 1913. Serial No. 788,391.

*To all whom it may concern:*

Be it known that I, GEORGE S. HILL, a citizen of the United States, residing at Strafford, in the county of Strafford and State of New Hampshire, have invented certain new and useful Improvements in Buttonhole-Sewing Machines; and I do hereby declare the following to be a full, clear, and exact description of the invention, such as will enable others skilled in the art to which it appertains to make and use the same.

The invention relates to buttonhole sewing machines of that type in which a work holding clamp and a stitch forming mechanism are relatively movable to form over-edge stitches extending along the sides and about the end of the buttonhole.

The object of the invention is to produce a buttonhole sewing machine of this type having its various parts and mechanisms constructed and arranged in an improved and simplified manner, and having an improved mode of operation, whereby the machine is adapted to cut and sew button holes at a high rate of speed, and in a uniformly reliable and satisfactory manner.

With this object in view, the invention comprises the features of construction and combinations of parts hereinafter described and set forth in the claims.

The various features of the invention will be understood from an inspection of the accompanying drawings and the following detailed description of the machine illustrated therein.

Figure 7A:
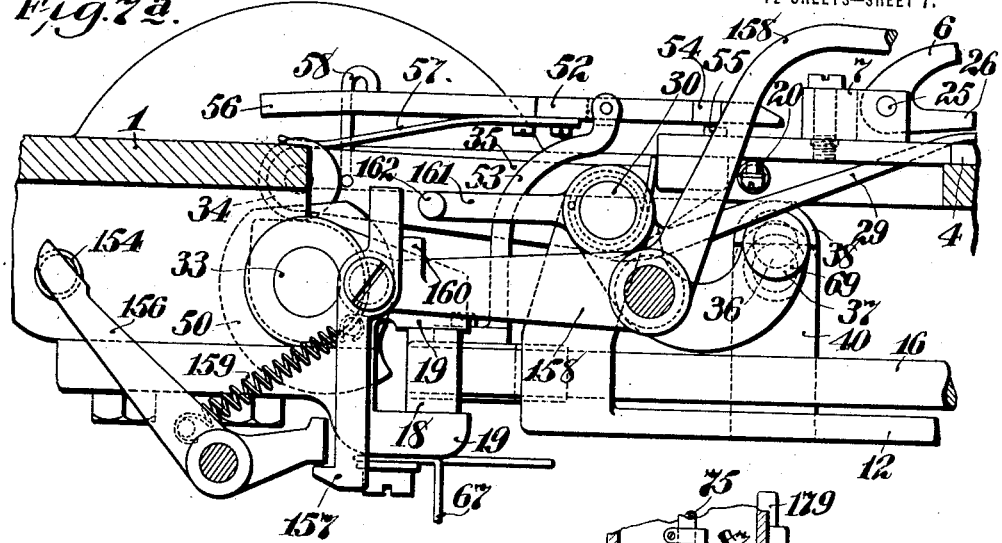
Figure 7:
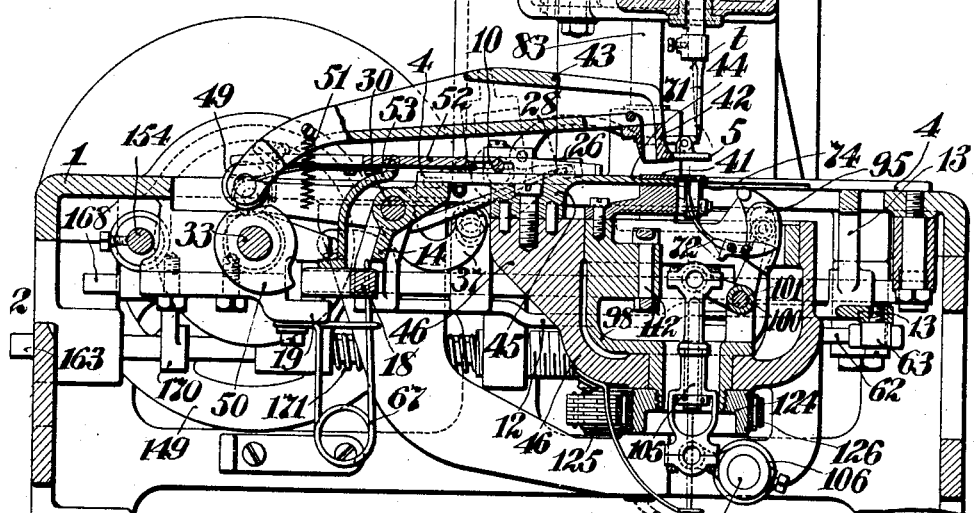

In the drawings, Figure 1 is an end elevation of a buttonhole sewing machine embodying the features of the invention in their preferred forms; Fig. 2 is a plan view of the machine; Fig. 3 is a front elevation, partly in section; Fig. 4 is a vertical sectional view on line 4—4, Fig. 2; Fig. 5 is a sectional plan view on line 5—5, Fig. 3; Fig. 6 is a horizontal sectional view on line 6—6, Fig. 1; Fig. 7 is a vertical sectional view on line 7—7, Fig. 2; Fig. 7ª is a detail elevation showing the starting devices and parts of the clamp operating devices; Fig. 8 is a vertical sectional view on line 8—8, Fig. 2; Fig. 9 is a detail plan view of the work holding clamp; Fig. 10 is a detail sectional view on line 10—10, Fig. 9; Fig. 11 is a sectional view on line 11—11, Fig. 2; Fig. 12 is a detail sectional view showing the devices for releasing the clamp; Fig. 13 is a vertical sectional view showing the turret carrying the under needle and looper; Fig. 14 is a plan view of the turret; Fig. 15 is a front elevation, partly in section, of the turret and devices carried thereby; Fig. 16 is a vertical sectional view similar to Fig. 13, showing the parts in a different position; and Fig. 17 is a detail of the clamp feeding cam and mechanism for rotating the stitch forming mechanism.

The machine illustrated comprises generally a work clamp for holding the material to be operated upon, a cutter for cutting a buttonhole in the material, stitch forming mechanism comprising a straight eye pointed upper needle, a curved eye pointed under needle and a coöperating looper, and mechanisms for operating the clamp, cutter and stitch forming mechanism, and for relatively moving them to properly position the material for cutting and sewing the buttonhole, and for relatively feeding and turning the clamp and stitch forming mechanism during the operation of the stitch forming mechanism to form over-edge stitches extending along the sides and about the ends of the buttonhole. The relative movements referred to are secured in the machine illustrated by a movement of the work clamp and by turning the stitch forming mechanism. The machine is stopped with the work clamp in proper position for the sewing of the button hole. When the machine is started, the clamp is closed and is then moved to bring the material into proper position for cutting the buttonhole, the cutter is operated, and the work is then returned to its initial position. The sewing mechanism is then started, and the clamp is fed and the sewing mechanism rotated to form the over-edge stitches about both ends and along the sides of the buttonhole, the sewing mechanism being brought to rest and the clamp opened for the removal of the work after the buttonhole is completed.

The operative parts of the machine shown in the drawings are carried by a frame 1 supported on a base 2 by trunnions 3 so that it may be swung up to give access to the parts on the under side which are normally inclosed and protected by the base.

The work clamping devices comprise work supporting plates 4 and clamp jaws 5 pivoted on the ends of arms 6 which are in turn pivotally supported upon blocks 7 adjustably secured to the plates 4 by screws 8, and guided in transverse grooves 9 formed in the plates. One of the blocks 7 carries an adjustable work gage 10 for positioning the work with relation to the clamping jaws. The work carrying plates 4 are connected by pivot screws 11 to a clamp carriage which consists of side bars 12 and end bars 13 and 14. The side bars of the clamp carriage are provided with bearings 15 arranged to slide upon the side rods 16 of a carriage support consisting of the side rods and two connecting bars 17 and 18 connecting the ends of the rods. The cross bar 17 is pivotally supported on the frame 1, and the bar 18 is supported between guide blocks 19, so that the support may be swung about its pivot to move the work clamp laterally during the sewing of the buttonhole. The work carrying plates 4 are normally drawn toward each other by a spring 20, and their inward positions are determined by stop lugs 21 arranged to engage grooves 22 formed in the under sides of the plates. The stop lugs are formed on blocks 23 which are adjustably secured by screws 24 in grooves formed in the upper face of the cross bar 14 of the clamp carrier (Figs. 6, 9 and 10).

The clamp carrying arms 6 are supported upon the blocks 7 by the pivot screws 25, and are provided with projecting portions or arms 26 arranged to swing in openings 27 formed in the work supporting plates 4. The lower projections 26 of the clamp carrying arms are provided with slots 28 engaged by the free ends of spring arms 29, the rear ends of which are secured to a transverse rock shaft 30 mounted in the cross bar 14 of the clamp carriage and arranged below the work supporting plates (Figs. 6, 7, 7ª and 9). When the shaft 30 is rocked, the work clamps are forced against the work by the arms 29, which are formed of spring metal so that they may bend to apply a yielding pressure to the material. The rock shaft 30 is moved in a direction to open the work holding clamps by a spring 31, and is moved in a direction to close the clamps by a cam 32 secured to a cam shaft 33, and arranged to engage a roll 34 carried by an arm 35 secured to the rock shaft and forming in connection with the arms 29 a clamp closing lever engaged by the cam 32. When the work holding clamps are closed, they are latched in closed position by a spring latching pin 36 which is mounted in an arm 37 secured to the rock shaft 30. The latch pin is arranged to engage the flange 38 of a sleeve 39 which is secured in a lug 40 on one of the side bars 12 of the clamp carriage (Fig. 12).

After the work clamps are closed, the clamp carriage is moved to bring the work into position for the cutting of the buttonhole. The devices for cutting the buttonhole comprise a fixed cutter plate 41 and a cutter 42 secured to the end of a cutter lever 43. The cutter plate 41 is secured on the end of a tongue 44 which projects from a block 45 secured to the turret supporting bracket 46. The cutter lever is provided with two laterally extending arms 47 which are pivotally connected by pivot screws 48 with the frame 1, and is provided at its rear end with a roll 49 arranged to engage a cam 50 secured to the cam shaft 33. The lever is held in engagement with the cam by a spring 51.

After the buttonhole has been cut, the work carrying clamp is moved forward to bring the buttonhole into register with the sewing mechanism, and during this movement the work carrying plates are spread to open the buttonhole. The means for thus spreading the work carrying plates consists of a spreader plate 52 pivotally supported on a bracket 53 which is secured to the cross bar 18 and the clamp carriage support. The spreader plate is provided with two cam surfaces 54 arranged to engage pins 55 which project from the upper surfaces of the work carrying plates 4. The spreader plate is provided with a rearwardly projecting arm 56 which overlies the clamp operating arm 35, and is provided with a leaf spring 57 bearing upon the arm. The upward movement of the spreader plate arm with relation to the clamp operating arm is determined by a stop 58 carried by the clamp operating arm and engaging the upper surface of the arm 56. When the clamp operating arm 35 is raised to close the work clamping jaws, the pins 55 underlie the broad part of the spreader plate 52, so that the plate engages the tops of the pins, and the spring 57 yields to allow the clamp operating arm 35 to move with relation to the arm 56. When the work clamp is moved back to bring the material into cutting position, the pins 55 move to the rear of the cam surfaces 54, so that the spreader plate may move down into position between the pins as indicated in Fig. 9. When the work clamp moves forward, the pins 55 ride over the cams 54, thus spreading the plates, and during the sewing of the buttonhole the pins ride against the edges of the broad part of the plates, so that the work carrying plates are held in spread position. When the work clamp is opened, the spreader plate is raised into the position indicated in Fig. 7ª by the downward movement of the clamp operating arm 35, so that the work carrying plates may move toward each other into their normal position, preparatory to the clamping and spreading of the material for the first buttonhole.

The clamp carriage is moved from sewing to cutting and back to sewing position by a grooved cam 57ª secured to the cam shaft 33, and arranged to engage a roll 58ª secured to the clamp carriage (Figs. 6 and 8). The outer wall of the groove in the cam 57ª is cut away at 59 so that the forward feed of the clamp carriage during the sewing of the buttonhole is not interfered with. The clamp carriage is moved on the guide rod 16 of the clamp carriage support to feed the material longitudinally of the buttonhole during the sewing by a cam groove 60 formed in the underside of a feed cam gear 61, and engaging a roll carried by one end of a lever 62, the other end of which engages a pivot block 63 on the cross bar 13 of the clamp carriage (Figs. 6 and 17). The clamp carriage support is moved about its pivot to move the material laterally during the sewing of the buttonhole by a cam groove 64 formed in the under side of the gear 61, and engaging a roll on the end of an arm 65 which is secured to one of the side rods 16. The outer wall of the cam groove 60 is recessed at 66 to allow the lever 62 to swing outward when the clamp carriage is moved from sewing to cutting position by the cam 57ª. The clamp carriage is forced yieldingly in a direction to hold the roll at the end of the lever 62 against the inner wall of the cam groove 60 by a spring 67 which bears against the cross bar 14 of the carriage (Fig. 1).

The work clamps are opened at the completion of the sewing by a lever 68 which is pivoted to the lug 40 and is provided with an arm engaging a spring pressed plunger 69 mounted in the sleeve 39 and arranged to engage the spring pressed latching pin 36 (Fig. 12). The end of the lever 68 is arranged in the path of a cam 70 secured to the gear 61, and so arranged that it passes under the lever 68 and rocks the lever to disengage the latch pin 36 from the flange 38 after the sewing of the buttonhole is completed, and just previous to the stopping of the machine (Fig. 6). When the latching pin 36 is thus disengaged from the flange 38, the spring 31 rocks the rock shaft 30 to open the work holding clamps, and to also raise the clamp spreading plate, as hereinbefore described.

The sewing or stitch forming mechanism comprises a straight eye pointed upper needle 71 which is arranged to pass through the fabric at a certain distance from the edge of the buttonhole, a curved eye pointed under needle 72 arranged to pass through the buttonhole slit, and a looper 73 for taking a loop of thread from the upper needle and passing it over the end of the under needle when it is in its retracted position, so that the under needle will pass up through the loop when it next advances. The needles are arranged to pass through a throat plate 74 which is arranged over the under needle, and is straddled by the work carrying plates, as is usual in this type of buttonhole sewing machine.

The upper needle is secured at the lower end of a hollow needle bar 75 which is mounted to reciprocate through a sleeve 76 and through an upper bearing 77 (Figs. 1, 4, 7 and 16). The needle bar is connected with the sleeve by a key and slot, so that the bar will rotate with the sleeve while being free to reciprocate vertically through it. The sleeve is mounted to turn in a bearing 78, and a sprocket wheel 79 is secured to the sleeve and is rotated through a complete revolution during the sewing of each buttonhole by a chain 80 which passes about the sprocket wheel against a tightening roll 81 and about the sprocket wheel 82 secured to a vertical shaft 83. The needle bar is reciprocated through a crank 84 secured to the front end of a crank shaft 85 and connected with the needle bar by a link 86, the upper end of which is pivoted to a sleeve 87 surrounding the needle bar. The crank shaft 85 is driven from a driving shaft 88 which is arranged out of axial alinement with the crank shaft, and is connected therewith by differential crank mechanism comprising a crank pin 89 on the inner end of the crank shaft 85 which engages a radially extending slot 90 in an arm 91 which is secured to the forward end of the driving shaft 88. This mechanism imparts a slow movement to the needle bar during the first part of its downward movement, and a rapid movement to the bar during the lower part of its reciprocation. The shaft 88 is continuously driven during the sewing through a pulley 92 secured to the shaft.

The under needle 72 is secured to a needle carrying arm 95 mounted upon an inclined stud 96 which is secured in a lug 97 on the upper edge of the turret 98. The needle carrying arm is oscillated by an arm 99 projecting upward from a sleeve 100 which is arranged to turn about a stud 101 supported in the turret. The connection between the needle carrying arm 95 and the actuator arm 99 comprises a roll 102 mounted on the upper end of the arm 99, and engaging a slot 103 formed in the needle carrying arm. The actuator arm 99 and slot 103 are so arranged that the travel of the roll 102 along the slot as the actuator arm moves forward, advances the under needle from its retracted to its advanced position, and then slightly retracts and dips the needle to form a loop through which the upper needle may pass, as indicated in Figs. 13 and 16. The actuator arm 99 is oscillated during the formation of each stitch through an arm 104 projecting from the sleeve 100, and connected by means of a link 105 with a crank arm 106 secured to a rock shaft 107 which is mounted in bearings on the frame 1. The shaft 107 is rocked through a link 108 which connects an arm secured to the shaft with a crank 109 formed on the shaft 88.

The eye of the upper needle extends through the needle substantially parallel to the line of feed, and the upper thread $t$ is threaded through the needle in the direction of the feed, so that the thread will draw freely through the eye during the sewing. After the upper needle has passed down through the loop of under needle thread formed by dipping the under needle, and while the under needle is being retracted, the looper 73 passes across that side of the upper needle which is toward the seam already sewed, engages the upper needle thread between the eye of the needle and the work, and during the movement of the needles to their retracted positions, carries the loop of upper needle thread thus taken over the end of the under needle, so that on the next upward stroke of the under needle it will pass up through this loop. The looper is provided with a laterally projecting shank by which it is adjustably secured in one end of a looper arm 110. The other end of the looper arm is pivotally connected to a horizontal arm 111 secured to the upper end of a vertical rock shaft 112 mounted in the turret. The shaft 112 is rocked to actuate the looper arm through a link 113 which connects an arm 114 on the lower end of the shaft with an arm 115 which projects downward from the sleeve 100. The looper arm carries a pivot block 116 arranged between the looper and the actuating arm 111, and engaging a curved slot 117 formed in a plate 118 which is fixed to the turret. The parts for operating and controlling the movements of the looper are so arranged and timed that the looper moves transversely of the feed across the side of the upper needle to take the thread therefrom, and then swings in the direction of feed to carry the loop over the point of the under needle. The upper thread $t$ leads to the eye of the upper needle through a tension device 119, through the guides 120 of a slack thread controlling device, through a thread guide 121, down through the hollow needle bar, and through a light tension 122 on the lower end of the needle bar. When the loop of upper needle thread held by the looper is released by the looper, the surplus of the slack thread in the loop is drawn up about the under needle by a vertically reciprocating thread finger 123 which coöperates with the thread guide 120. The thread finger is secured to the upper end of the link 108, and is operated by the crank 109 to take up and give out the slack thread at the proper time.

The turret 98 which carries the under thread mechanism and throat plate is mounted in bearings in the turret bracket 46, and is provided at its lower end with a sprocket wheel 124 which is connected with a similar sprocket wheel 125 on the lower end of the shaft 83 by a chain 126. During the sewing of each buttonhole the shaft 83 is turned through a complete revolution, and through the sprocket wheels and chains described, turns the turret and upper needle through a complete revolution. The rotation of the shaft 83, and of the stitch forming mechanism, is always in the same direction, these parts being turned rotation after rotation during the sewing of successive buttonholes. The devices for thus rotating the shaft 83 comprise an arm or link 127, one end of which is pivotally connected to a pin 128 on the upper side of the gear 61, and the other end of which is connected by a link 129 to an arm 130 secured to the shaft 83 (Figs. 3, 4, 8 and 17). The link 127 carries a roll 131 which travels in a cam groove 132 formed in a disk 133 which is secured to the frame 1. During the operation of the stitch forming mechanism the gear 61 is driven through a single revolution by a pinion 134 secured to the lower end of a vertical shaft 135. The upper end of the shaft is connected by a universal joint to a shaft section 136, the upper end of which carries a worm wheel 137 engaging a worm 138 on the shaft 88 (Fig. 4). The cam groove 132, and the arms and links connecting the gear 61 with the shaft 83, are so proportioned and arranged that the stitch forming mechanism is moved at varying speeds, or held stationary during the sewing about the buttonhole, according to the part of the buttonhole at which the stitch forming mechanism is operating, while the gear 61 is given a uniform and continuous movement to feed the work longitudinally of the buttonhole and move it laterally at the proper times.

The under thread $t'$ and the stay thread $s$ lead to the under needle and throat plate respectively through the hollow link 105 forming a part of the driving connections for the under thread mechanism, and since the turret is turned rotation after rotation in the same direction, the stay and under threads would be twisted one about the other, if means were not provided to avoid such twisting together of the threads. Such twisting together of the threads is avoided by providing guides for the threads which are given a rotation for each rotation of the turret, and by providing a support for one or both of the thread supplies which turns with these guides. As shown, one of the thread supplies 139, preferably that of the stay thread, is carried by a support 140 secured to a gear 141 which is in turn secured to the upper end of a shaft 142 mounted within the shaft 83 (Figs. 1, 4 and 8). The support 140 is turned in a direction opposite to that in which the shaft 83 and turret is turned through a beveled gear 143 connecting the gear 141 with a similar gear 144 secured to the shaft 83. The shaft 142 is provided with two longitudinal holes extending from end to end of the shaft, one of the holes communicating with a tube 145 forming the center of the support 140, and the other communicating with a lateral opening 146 through the hub of the gear 141. The stay thread is lead from the thread supply 139 down through the shaft 142, thence through a guide eye 147 to the lower end of the link 105. The under thread is led from its supply through a guide tube 148, thence through the shaft 142, through the guide eye 147 and link 105. As the shaft 142 is given a revolution for each revolution of the turret and sewing mechanism, twisting together of the stay and under threads is prevented.

When the machine is started, the cam shaft 33 is driven through a single revolution to close the work holding clamps, move the material from sewing into cutting position, operate the cutter, and return the clamp to sewing position. As the cam shaft 33 completes its revolution, the mechanism for driving the shaft 88 is thrown into operation, and this shaft is rotated during the sewing to actuate the sewing mechanism and to feed the work carrying clamp longitudinally of the buttonhole and move it laterally. The cam gear 61 is driven through a single revolution during the sewing of a buttonhole, and as it completes its rotation the mechanism for driving the shaft 88 is thrown out of operation, thus completing the cycle of operations performed by the machine, and bringing the parts into their initial position.

The mechanism for driving the cam shaft 33 through a single revolution comprises a pulley 149 loosely mounted on the end of the shaft, and provided with a driving lug 150 adapted to engage a coöperating lug 151 formed on a cam sleeve 152 which is fast on the shaft 33. The pulley 149 is provided with a grooved hub engaged by an arm 153 secured to the ends of a shipper rod 154. The rod 154 is forced in a direction to bring the driving lug 150 into position to engage the lug 151 by a spring 155. The pulley is normally held in retracted or inactive position against the tension of the spring 155 by a latch lever 156 adapted to engage the end of the shipper rod (Figs. 5, 6 and 7a). The front end of the latch lever 156 is arranged to be engaged by a tripping dog 157 pivoted on the rear end of a tripping lever 158, the front end of which projects into position to be conveniently engaged by the finger of the operator. A spring 159 connects the dog 157 and latch lever 156, and normally holds the latch lever in position to be engaged by the end of the shipper rod 154, and holds the tripping dog in position with its upper projection against a stop 160 on the tripping lever (Fig. 7a). When the front end of the tripping lever 158 is depressed, the tripping dog 157 rocks the latch lever 156 to release the shipper rod 154, so that the pulley 149 is connected with the shaft 33 through the lugs 150 and 151. When the operator releases the tripping lever 158, the tripping lever and dog 157 are returned to normal position, so that the latch lever 156 is free to return to latching position when the shipper rod 154 is moved to disconnect the pulley 149 from the shaft 33. If the operator should fail to release the tripping lever 158, the dog 157 will be disengaged from the latch lever 156 by an arm 161 extending rearwardly from the clamp closing rock shaft 30, and is provided with a projection 162 adapted to engage the upward extension of the tripping dog when the clamp carriage is moved back to bring the work into position for cutting.

The mechanism for stopping the cam shaft 33 after it has made a single revolution comprises a longitudinally movable rock shaft 163 mounted below the shaft 33 and provided with an upwardly projecting arm 164 carrying a projecting pin 165. The pin is adapted to fit within a slot 166 formed in the lug 151, and to ride on a double cam 167 formed on the cam sleeve 152. The shaft 163 is connected with the shipper rod 154 by a pin 168 projecting from a collar 169 secured to the shipper rod, and engaging a slot formed in an arm 170 secured to the rod 163. The rock shaft 163 is forced in a direction to press the pin 165 toward the shaft 33 by a spring 171.

When the shipper rod is moved toward the left in Fig. 6 to engage the pulley 149 with the cam shaft 33, the shaft 163 is rocked to disengage the pin 165 from the slot in the lug 151, the pin then occupying a position to the left of the lug 151 in Fig. 6. This frees the shaft 33 so that it may be driven by the pulley 149. During the rotation of the shaft 33 the end of the pin 165 rides on the periphery of the cam 167, while the left-hand side of the pin rides against the side of the cam flange indicated in dotted lines in Fig. 6. The side flange of the cam moves the pin 165 toward the right, thus rocking the shaft 163 to retract the shipper rod 154 and disengage the pulley 149 from the shaft. This disengagement takes place just as the shaft 33 is about to complete its revolution. During the rotation of the shaft, the peripheral portion of the cam 167 acts to move the shaft 163 longitudinally, and as the cam shaft 33 completes its rotation the pin 165 rides off the high part of the cam 167 and the spring 171 causes the pin to snap into the slot in the lug 151, thus arresting the cam shaft and locking it in position.

As the cam shaft 33 completes its revolution, the mechanism for driving the shaft 88 is thrown into operation, and the longitudinal movement of the rock shaft 163 is utilized to effect the throwing in of this mechanism. The mechanism for driving the shaft 88 comprises the pulley 92 fast on the shaft, a pulley 172 loosely mounted on the shaft, and a belt shifter 173 for shifting the belt from one pulley to the other (Figs. 2, 4, 6 and 11). The belt shifter is carried on an arm 174 pivoted at 175 to the frame 1, and forced in a direction to hold the belt on the loose pulley by a spring 176. The end of the arm 174 is slotted, and is engaged by a pin 177 projecting downward from the end of a stop arm 178 which is secured to a rock shaft 179 and carries a stop roll 180. The rock shaft 179 is mounted to slide longitudinally in bearings in the frame 1, and is forced upward by a spring 181. The end of the stop roll 180 is held by the spring 181 in engagement with the periphery of a braking and stopping cam 182 which is mounted on the shaft 88, and is yieldingly connected with the pulley 92 by a pin 183 which projects through a slot in the hub of the pulley and engages a spring 184 mounted in a recess within the pulley (Fig. 4). An arm 185 is secured to the lower end of the rock shaft 179 and is provided with a projecting pin 186 adapted to be engaged by one arm of a latching lever 187. The other arm of the lever is provided with a projecting pin 188 arranged to be engaged by a cam 189 which is secured to the upper side of the gear 61. The latching lever is forced in a direction to engage the pin 186 by a spring 190. The arm 185 is also provided with a depending plate 191 engaged by the end of the rock shaft 163. When the rock shaft 163 is moved longitudinally in the manner above described, just prior to the completion of the rotation of the cam shaft 33, it acts on the arm 185 to rock the shaft 179 in a direction to swing the stop roll 180 into inactive position, and to shift the belt from the loose to the tight pulley. When the arm 185 and rock shaft 179 are thus moved, the end of the latching lever 187 engages the pin 186 on the arm 185, and retains the shaft in position with the driving belt on the tight pulley until the gear 61 has practically completed a single revolution. The cam 189 then strikes the pin 188 on the latch lever 187 and disengages the latch lever from the arm 185, allowing the spring 176 to shift the belt on to the loose pulley 172, and to swing the rock shaft 179 in a direction to bring the stop roll 180 into the path of the braking cam 182'. The braking cam 182' then acts on the end of the roll 180 and forces the shaft 179 longitudinally against the tension of the spring 181, thus overcoming the momentum of the parts and bringing the shaft 88 to rest with the end of the stop roll 180 in the depression between the braking cam 182' and the stop cam 182, the stop cam 182 acting to prevent over-running of the shaft. The forward movement of the shaft after the belt has been shifted carries the cam 189 beyond the pin 188, and brings the parts into the stopping position indicated in the drawings.

While it is preferred to employ the construction and arrangement of parts shown and described, it will be understood that this construction and arrangement is not essential to the broader features of the invention, and may be varied and modified without departing therefrom.

Having explained the nature and object of the invention, and specifically described one form of machine in which it may be embodied, what I claim is:—

1. A buttonhole sewing machine, having, in combination, stitch forming mechanism, a clamp carrier, a work holding clamp on the carrier comprising clamp carrying arms, a rock shaft on the carrier provided with arms engaging the clamp carrying arms to close the clamp, a cam mounted independently of the clamp carrier for actuating the rock shaft, an arm on the rock shaft engaged by the cam, a latch for retaining the rock shaft in clamp closing position during the sewing, and means for operating the latch to release the clamp after the completion of the sewing.

2. A buttonhole sewing machine, having, in combination, stitch forming mechanism, a clamp carrier movable lengthwise of the buttonhole, clamp carrying arms on the carrier, a rock shaft on the carrier provided with arms for engaging the clamp carrying arms to close the clamp, a cam shaft mounted independently of the carrier and provided with a cam for actuating the rock shaft, an arm on the rock shaft engaged by the cam, and means for holding the clamp closed during the sewing and for opening the clamp at the completion of the sewing.

3. A button hole sewing machine, having, in combination, stitch forming mechanism, a clamp carrier movable lengthwise of the buttonhole, clamp carrying arms on the carrier, a rock shaft on the carrier provided with arms for engaging the clamp carrying arms to close the clamp, a cam mounted independently of the clamp carrier for actuating the rock shaft, an arm on the rock shaft engaged by the cam when the clamp is in work receiving position, a latch for retaining the rock shaft in clamp closing position during the sewing, and means for releasing the shaft after the completion of the sewing.

4. A buttonhole sewing machine, having, in combination, stitch forming mechanism, a work holding clamp comprising work supporting plates and coöperating pivoted clamp carrying arms provided with lower extensions, a clamp carriage on which the plates are mounted, a rock shaft mounted on the carriage below the plates, arms on the rock shaft engaging the extensions of the clamp carrying arms, mechanism for relatively actuating the stitch forming mechanism and clamp to sew about a buttonhole, mechanism automatically actuating the rock shaft to close the clamp prior to the sewing, independent means for holding the clamp closed during the sewing, and means for releasing the clamp after the sewing is completed.

5. A buttonhole sewing machine, having, in combination, a work holding clamp, stitch forming mechanism comprising an upper needle, an under needle, a looper arm, a looper secured in one end of the arm, a rock shaft, an arm on the rock shaft pivoted to the other end of the looper arm, mechanism for rocking the shaft to reciprocate the looper arm, a cam for guiding the looper arm intermediate said ends, and mechanism for relatively moving the work clamp and sewing mechanism to sew about a buttonhole.

6. A buttonhole sewing machine, having, in combination, a work holding clamp, stitch forming mechanism comprising an upper needle, an under needle, a turret on which the under needle is mounted, a vertical rock shaft in the turret, a horizontal arm on the rock shaft, a horizontal looper arm having one end pivoted to the end of the arm on the rock shaft, a looper secured in the other end of the looper arm, a cam for guiding the looper arm intermediate said ends, mechanism for reciprocating the under needle and for rocking the rock shaft, and mechanism for relatively moving the work clamp and sewing mechanism to sew about a buttonhole.

7. A buttonhole sewing machine, having, in combination, stitch forming mechanism, a work clamp, a cutter, a cam shaft and connections for closing the clamp, for moving the clamp between sewing and cutting positions, and for operating the cutter, mechanism for driving the cam shaft and stopping it, mechanism thrown into operation by the cam shaft for actuating the sewing mechanism and for feeding the work clamp during the sewing to sew about a buttonhole.

8. A buttonhole sewing machine, having in combination, stitch forming mechanism, a work clamp, a cutter, cams and connections for closing the clamp, moving the clamp between sewing and cutting positions and for operating the cutter, mechanism thrown into operation by the operator for actuating and stopping the cams, independent cams for feeding the clamp, mechanism for actuating the stitch forming mechanism and feed cams after the former cams have stopped, and for stopping the stitch forming mechanism and feed cams after the buttonhole is completed.

9. A buttonhole sewing machine, having, in combination, stitch forming mechanism, a work clamp, a cutter, a cam shaft and connections for closing the clamp, for moving the clamp between sewing and cutting positions and for operating the cutter, mechanism thrown into operation by the operator for driving the cam shaft, devices for stopping the cam shaft, mechanism thrown into operation by the stopping devices for actuating the stitch forming mechanism and work clamp to sew about a buttonhole, and means for stopping said mechanism after the buttonhole is completed.

10. A buttonhole sewing machine, having, in combination, stitch forming mechanism, a work clamp, a clamp carriage, a support on which the carriage is longitudinally movable, a cutter, a cam for moving the carriage on the support from sewing to cutting and from cutting to sewing position, a feed cam for moving the carriage during the sewing, a cam for moving the carriage support laterally during the sewing, mechanism for actuating the first cam, and independent mechanism for actuating the two latter cams.

11. A buttonhole sewing machine, having, in combination, stitch forming mechanism, a work clamp, a cutter, a clamp carriage, a cam for moving the clamp carriage between cutting and sewing positions recessed to permit independent movement of the carriage, a feed cam for moving the clamp carriage during the sewing recessed to permit movement of the carriage by the former cam, and mechanisms for successively actuating the cams.

12. A buttonhole sewing machine, having, in combination, stitch forming mechanism, a work clamp comprising work supporting plates and coöperating clamping jaws, means for moving the work clamp in a direction lengthwise of the buttonhole, projections on the work supporting plates, a spreader plate mounted in relatively fixed relation longitudinal to the work clamp, and means for moving the spreader plate into and out of the path of the projections.

13. A buttonhole sewing machine, having, in combination, stitch forming mechanism, a work clamp, a cutter, a cam shaft, a cam on the shaft, and connections for closing the clamp, a second cam on the shaft and connections for relatively moving the clamp and cutter into and out of cutting relation, a third cam on the shaft and connections for operating the cutter, mechanism for driving the cam shaft and stopping it, mechanism thrown into operation by the cam shaft for actuating the sewing mechanism and for relatively feeding the work clamp, and sewing mechanism to sew about a buttonhole.

14. A buttonhole sewing machine, having, in combination, stitch forming mechanism, a work clamp, a cutter, a cam and connections for closing the clamp, a second cam and connections for relatively moving the clamp and cutter into and out of cutting relation, a third cam and connections for operating the cutter, mechanism thrown into operation by the operator for actuating and stopping the cams, independent cams for relatively feeding the clamp and stitch forming mechanism, mechanism for actuating the stitch forming mechanism and feed cams after the former cams have stopped and for stopping the stitch forming mechanism and feed cams after the buttonhole is completed.

15. A buttonhole sewing machine, having, in combination, stitch forming mechanism, a work clamp, a cutter, a cam shaft, a cam on the shaft and connections for closing the clamp, a second cam on the shaft and connections for relatively moving the clamp and cutter into and out of cutting relation, a third cam on the shaft and connections for operating the cutter, mechanism thrown into operation by the operator for driving the cam shaft, devices for stopping the cam shaft, mechanism for actuating the stitch forming mechanism and work clamp to sew about a buttonhole, and means for stopping said mechanism after the buttonhole is completed.

16. In a buttonhole sewing machine, the combination with stitch-forming mechanism, of a work-clamp, feeding mechanism for producing relative feeding movements between the work-clamp and the stitch-forming mechanism, a buttonhole cutting device, actuating means therefor including a cutter-shaft with controlling means for causing it to perform a single rotation only preparatory to each buttonhole stitching operation, and clamp-closing means operatively connected with the cutter-shaft independently of its connection with the cutting device and actuated independently of the feeding mechanism.

17. In a buttonhole sewing machine, the combination with stitch-forming mechanism, of a work-clamp, a buttonhole cutting device, a cutter-shaft with controlling means for causing it to perform a single rotation only preparatory to a buttonhole stitching operation, means carried by the cutter-shaft for actuating the cutting device, and means also carried by the cutter-shaft and acting independently of said actuating means for effecting the closing of the work-clamp.

18. In a buttonhole sewing machine, the combination with stitch-forming mechanism, of a work-clamp, mechanism including a feed-wheel for producing relative feeding movements between the work-clamp and the stitch-forming mechanism, feed-wheel actuating means, a cutter-shaft driven independently of the feed-wheel actuating means, a buttonhole cutting device operatively connected with said cutter-shaft, clamp-closing means operatively connected with the cutter-shaft independently of the buttonhole cutting device, and clamp-opening means operatively connected with and actuated by said feed-wheel.

19. In a buttonhole sewing machine, the combination with stitch-forming mechanism, of a work-clamp, feeding mechanism for producing relative feeding movements between the work-clamp and the stitch-forming mechanism, a buttonhole cutting device, actuating means therefor operative to effect a buttonhole cutting action preparatory to the operation of the stitch-forming mechanism, an operative connection between the cutting device and its actuating means, and clamp-closing means operatively connected with said actuating means independently of its connection with the cutting device and of the feeding mechanism.

20. In a buttonhole sewing machine, the combination with stitch-forming mechanism, actuating means therefor including a rotary shaft, of a work-clamp, feeding mechanism for producing relative feeding movements between the work-clamp and the stitch-forming mechanism, a buttonhole cutting device, actuating means therefor including a cutter-shaft driven independently of said rotary shaft, an operative connection between the cutting device and its actuating means, and clamp-closing means operatively connected with the cutter-shaft independently of its connection with the cutting device.

21. A buttonhole sewing machine having, in combination, stitch forming mechanism, a work clamp, a cutter, a cam and connections for closing the clamp, a second cam and connections for relatively moving the clamp and cutter into and out of cutting relation, a third cam and connections for operating the cutter, mechanism thrown into operation by the operator for actuating and stopping the cams, mechanism for relatively feeding the work clamp and stitch forming mechanism, and mechanism for actuating the stitch forming and feeding mechanisms after said cams have stopped and for stopping the stitch forming and feeding mechanisms after the buttonhole is completed.

22. A buttonhole sewing machine, having, in combination, stitch forming mechanism, a work clamp, a cutter, a cam shaft, a cam fixed on said shaft and connections for closing the clamp, a second cam on said shaft and connections for relatively moving the clamp and cutter into and out of cutting relation, a third cam on said shaft and connections for operating the cutter, mechanism thrown into operation by the operator for driving the cam shaft, devices for stopping the cam shaft, mechanism for actuating the stitch forming mechanism and work clamp to sew about a buttonhole, and means for stopping said mechanism after the buttonhole is completed.

23. A buttonhole sewing machine, having, in combination, stitch forming mechanism, a clamp carrier movable lengthwise of the buttonhole, clamp carrying arms on the carrier, a rock shaft on the carrier provided with arms for engaging the clamp carrying arms and with an arm through which it is rocked to close the clamp, a rotating cam carrier which makes a single revolution during each cycle of the machine, a cam on the cam carrier arranged to directly engage the arm on the rock shaft when the clamp carrier is in work receiving position, and means for holding the clamp closed during the sewing and for opening the clamp at the completion of the sewing.

24. A buttonhole sewing machine having, in combination, stitch forming mechanism, a work clamp, buttonhole cutting devices, a cam shaft, three cams on the shaft, connections through which one cam closes the clamp, another cam gives a relative traverse to the clamp and cutting devices and another cam actuates the cutter, mechanism for driving the shaft and stopping it, mechanism thrown into operation by the cam shaft for actuating the stitch forming mechanism and work clamp to sew about a buttonhole after the cam shaft is stopped.

25. A buttonhole sewing machine having, in combination, stitch forming mechanism, a work clamp, a cutter, a cam and connections for closing the clamp, a second cam and connections for giving a relative traverse to the clamp and cutter, a third cam and connections for operating the cutter, mechanism thrown into operation by the operator for actuating and stopping the cams, independent cams for relatively feeding the clamp and stitch forming mechanism, mechanism for actuating the stitch forming mechanism and feed cams after the former cams have stopped and for stopping the stitch forming mechanism and feed cams after the buttonhole is completed.

26. A buttonhole sewing machine having, in combination, stitch forming mechanism, a work clamp, a cutter, a cam shaft, a cam on the shaft and connections for closing the clamp, a second cam on the shaft and connections for giving a relative traverse to the clamp and cutter, a third cam on the shaft and connections for operating the cutter, mechanism thrown into operation by the operator for driving the cam shaft, devices for stopping the cam shaft, mechanism for actuating the stitch forming mechanism and work clamp to sew about a buttonhole, and means for stopping said mechanism after the buttonhole is completed.

27. A buttonhole sewing machine having, in combination, stitch forming mechanism, a work clamp, a cutter, a cam and connections for closing the clamp, a second cam and connections for giving a relative traverse to the clamp and cutter, a third cam and connections for operating the cutter, mechanism thrown into operation by the operator for actuating and stopping the cams, mechanism for relatively feeding the work clamp and stitch forming mechanism, and mechanism for actuating the stitch forming and feeding mechanism after said cams have stopped and for stopping the stitch forming and feeding mechanisms after the buttonhole is completed.

28. A buttonhole sewing machine having, in combination, stitch forming mechanism, a work clamp, a cutter, a cam shaft, a cam fixed on said shaft with connections for closing the clamp, a second cam on said shaft and connections for giving a relative traverse to the clamp and cutter, a third cam on said shaft and connections for operating the cutter, mechanism thrown into operation by the operator for driving the cam shaft, devices for stopping the cam shaft, mechanism for actuating the stitch forming mechanism and work clamp to sew about a buttonhole and means for stopping said mechanism after the buttonhole is completed.

29. A buttonhole sewing machine having, in combination, stitch forming mechanism, a work clamp, feeding mechanism for producing relative feeding movements between the work clamp and stitch forming mechanism, a buttonhole cutter lever, a clamp closing lever, a cam shaft with controlling means for causing it to rotate and stop preparatory to each buttonhole stitching operation, a cam on the cam shaft for actuating the cutter lever, and a second cam on the cam shaft for engaging and actuating the clamp closing lever to close the clamp.

30. A buttonhole sewing machine having, in combination, stitch forming mechanism, a work clamp, feeding mechanism for producing relative feeding movements between the work clamp and stitch forming mechanism, a buttonhole cutter lever, a clamp closing lever, a cam shaft with controlling means for causing it to rotate and stop preparatory to each buttonhole stitching operation, a cam on the cam shaft for actuating the cutter lever, a second cam on the cam shaft for engaging and actuating the clamp closing lever to close the clamp, a latch for holding the clamp closed during the sewing, and means for releasing the latch to open the clamp.

GEORGE S. HILL.

Witnesses:
 CHESTER E. ROGERS,
 LAURA M. GOODRIDGE.